(12) United States Patent
Duong

(10) Patent No.: US 6,307,587 B1
(45) Date of Patent: Oct. 23, 2001

(54) INPUT CIRCUIT FOR AN IMAGE PROCESSOR

(75) Inventor: Tuan A. Duong, Glendora, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 08/954,600

(22) Filed: Oct. 20, 1997

Related U.S. Application Data

(60) Provisional application No. 60/028,959, filed on Oct. 18, 1996.

(51) Int. Cl.[7] .............................. H04N 5/225; H04N 5/76
(52) U.S. Cl. ............................................. 348/218; 348/231
(58) Field of Search ..................................... 348/218, 219, 348/231, 36, 333, 170, 350; 382/173, 284, 312, 318; 345/121, 196

(56) References Cited

U.S. PATENT DOCUMENTS 5,208,583 * 5/1993 Cusick et al. ...................... 345/196
5,510,830 * 4/1996 Ohia et al. ............................ 348/36
5,528,290 * 6/1996 Saund ................................... 348/218
5,706,362 * 1/1998 Yabe .................................... 348/170
5,880,778 * 3/1999 Akagi ................................... 348/218

* cited by examiner

Primary Examiner—Wendy R. Garber
Assistant Examiner—Luong Nguyen
(74) Attorney, Agent, or Firm—Fish & Richardson P.C.

(57) ABSTRACT

A circuit is used with an imager that is capable of capturing an image. The circuit includes a memory that is configured to during a first time interval, store a first representation of a first subimage of the image from the imager and during a second time interval, receive an update from the imager and use the update and the first representation to store a second representation of a second subimage of the image. The first subimage partially overlaps the second subimage, and the update represents a portion of the second subimage that is not present in the first subimage. The circuit also has an output circuit that is configured to during the first time interval, use the first representation to generate output signals representative of the first subimage and during the second time interval, use the second representation to generate output signals representative of the second subimage.

23 Claims, 7 Drawing Sheets

INPUT CIRCUIT FOR AN IMAGE PROCESSOR

Under 35 U.S.C. §119(e), this application claims benefit of prior U.S. provisional application Ser. No. 60/028,959, filed Oct. 18, 1996.

BACKGROUND OF THE INVENTION

The invention relates to an input circuit for an image processor.

When processing images that vary both spatially and in time, the most challenging task typically is to process the varied information in a manner that provides a good, valid solution in real-time. Because software-based approaches typically are slower than hardware approaches, hardware is often chosen to process the images.

One type of hardware that is used to process images is an analog image processor (e.g., a Three Dimensional Artificial Neural Network (3DANN)). The image processor typically relies on input from an imager which electrically captures the image and presents an electrical representation of the image to the image processor. The image processor has a limit on the size of image that the processor can process at one time. As a result, typically, the size of the imager is chosen so that the size limit of the image processor is not exceeded.

SUMMARY OF INVENTION

In general, in one aspect, the invention features a circuit that is used with an imager that is capable of capturing an image. The circuit includes a memory that is configured to during a first time interval, store a first representation of a first subimage of the image from the imager and during a second time interval, receive an update from the imager and use the update and the first representation to store a second representation of a second subimage of the image. The first subimage partially overlaps the second subimage, and the update represents a portion of the second subimage that is not present in the first subimage. The circuit also has an output circuit that is configured to during the first time interval, use the first representation to generate output signals representative of the first subimage and during the second time interval, use the second representation to generate output signals representative of the second subimage.

The advantages of the invention may include one or more of the following. Any type and size of imager can be interfaced to an image processor. The image processor can process images in a piecewise fashion. Data transfer times from the imager to the processor are reduced. Power consumption is minimized. The circuit has a compact size.

Implementations of the invention may include one or more of the following. The memory may include memory cells that are configured to shift the first representation among the cells to form the second representation. The memory cells may be configured to discard a portion of the first representation to form the second representation.

The memory cells may include first, second and third groups of memory cells that are configured to store the first representation during the first time interval. The first group of memory cells may be configured to receive the update during the second time interval, and the second group of memory cells may be configured to discard a portion of the first representation during the second time interval. The portion may be equivalent in size to the update. The third group of memory cells may be configured to shift the first representation from the first group of memory cells toward the second group of memory cells during the second time interval.

The second subimage may be offset from the first subimage along one of at least two different directions, and during the second time interval, the memory cells may be also configured to shift the first representation among the cells along the one of the directions. The memory may also include at least two shift register banks. Each different shift register bank may be associated with a different one of the directions. Each bank may be configured to receive the update when the direction associated with the bank corresponds to the one of the directions.

The second subimage may be offset from the first subimage along one of at least three different directions, and during the second time interval, the memory cells may be further configured to shift the first representation among the cells along the one of the directions. The memory may also include at least three shift register banks. Each different shift register bank may be associated with a different one of the directions. Each bank may be configured to receive the update when the direction associated with the bank corresponds to the one of the directions. At least two of the directions may be orthogonal to each other, and at least two of the directions may be directly opposed.

The imager may include a rectangular array of pixel cells that are configured to capture the image. The array may be arranged in rows and columns, and each pixel cell may provide an output. The first representation may be indicative of the outputs of the pixel cells from a subregion (e.g., another rectangular array of pixel cells) of the array.

The update may be indicative of the outputs of the pixel cells from one of the rows or columns of the array. The output circuit may include digital-to-analog converters. Each different digital-to-analog converter may be connected to a different one of the memory cells.

In general, in another aspect, the invention features a method of processing an image. The method includes storing a first representation of a first subimage of the image. The first subimage is less than the whole image. During a first time interval, output signals representative of the first subimage are generated. During a second time interval, an update representing an additional portion of the image is received. The update and the first representation are used to store a second representation of a second subimage of the image. The first subimage partially overlaps the second subimage, and the update represents a portion of the second subimage not present in the first subimage. The method also includes using the second representation to generate output signals representative of the second subimage.

In general, in another aspect, the invention features a circuit for loading a second subimage of an image that is captured by an imager. The second subimage partially overlaps a first subimage of the image and is partially offset from the first subimage along one of at least two directions. The imager is capable of furnishing a first representation of the first subimage and an update representing a portion of the second subimage not present in the first subimage. The circuit includes at least two shift register banks, and each different shift register bank is associated with a different one of the directions and is configured to receive the update when the second subimage is offset from the first subimage along the direction.

The circuit includes memory cells that are connected to the banks and configured to during a first time interval, store the first representation in first, second and third groups of the memory cells. During the second time interval, a portion of the first representation stored in the second group of memory cells is discarded, the third group of memory cells shifts the first representation from the first group of memory cells toward the second group of memory cells, and the first group of memory cells stores the update. The circuit also has analog-to-digital converters, and each different analog-to-digital converter is connected to a different one of the memory cells. The converters are configured to during the first time interval, generate output signals representative of the first representation, and during the second time interval, generate output signals representative of the second representation.

Other advantages and features will become apparent from the following description and from the claims.

DESCRIPTION OF THE PREFERRED EMBODIMENTS

Figure 1:
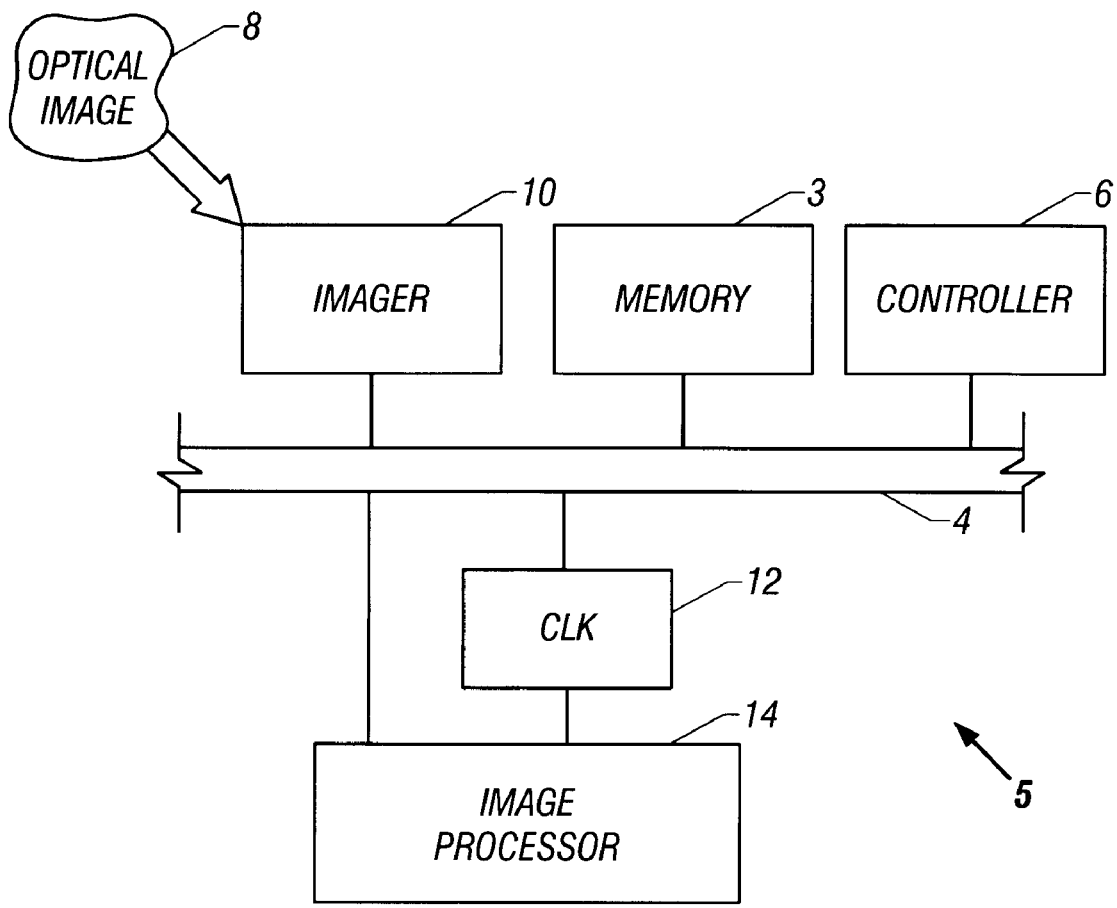
FIG. 1 is a block diagram illustrating a neural network system.
Figure 2:
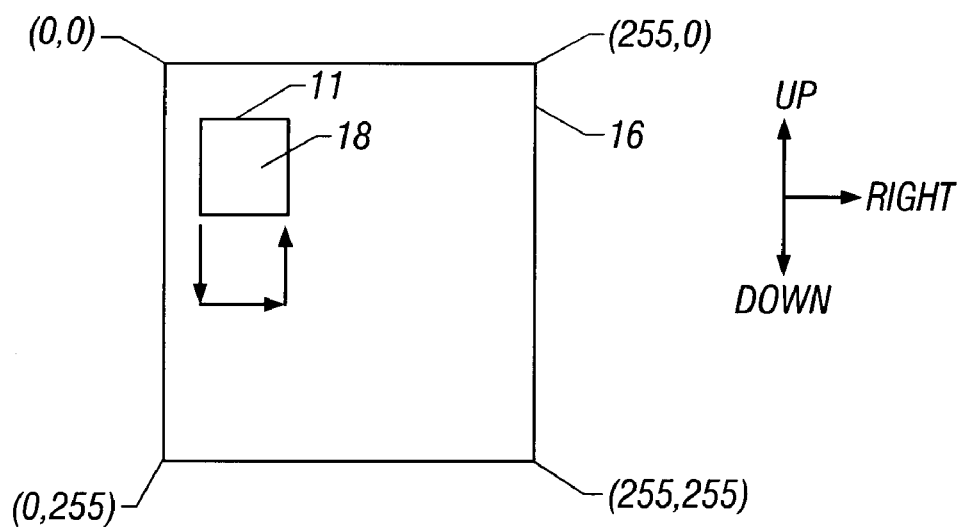
FIG. 2 is a schematic diagram illustrating an image captured by the imager of FIG. 1.

Referring to FIGS. 1 and 2, an image processing system 5 performs pattern recognition and classification on an optical image 8. The system 5 has an imager 10 that has an array of pixel sensors to digitally capture the optical image 8 as a digital image 16. The digital image 16 is treated as an array of 255×255 pixels with one pixel associated with one pixel sensor, and a representation of the pixels of the image 16 is stored in a memory 3. The representation of the image 16 that is stored in the memory 3 is ultimately used by an analog image processor 14 (e.g., a 3-DANN) which performs pattern recognition and classification of the image 16. A column loading input chip (CLIC) 12 is constructed to transport the representation of the captured image 16 to the imager processor 14 for processing.

The image processor 14 is capable of processing up to a 64×64 pixel image at one time. Note that the image is smaller than the image 16 captured by the imager 10. Not only is the image 16 too large to be processed at one time by the processor 14, the memory 3 stores digital data, a format incompatible for the analog inputs of the image processor 14. However, the CLIC 12 addresses these problems by retrieving the representation of the image 16 from the memory 3 in a piecemeal fashion and by converting the digital data into analog signals for processing by the processor 14. To accomplish this, the image processor 14 interacts with the CLIC 12 to effectively, systematically pan a rasterizing window 11 over the image 16 to scan the image 16.

In effect, the window 11 captures a subimage 18 of the image 16. Every time the position of the window 11 changes, the subimage 18 changes. The CLIC 12 presents an analog representation of the subimage 18 in the window 11 to the image processor 14 for each position of the window 11.

Figure 11:
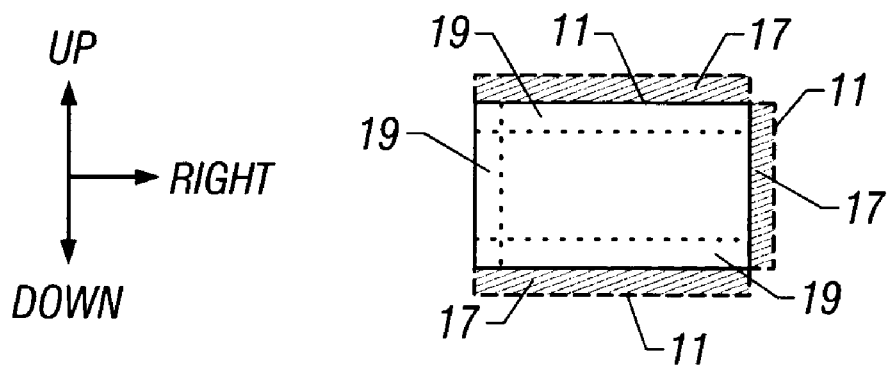
FIG. 11 is a schematic diagram illustrating movement of the rasterizing window.

FIG. 11 shows consecutive positions of the window 11 being spaced only one row or column of pixels apart. As a result, each time the position of the window 11 changes, one column or row of pixels 19 of the old subimage 18 is effectively discarded. One column or row of pixels 17 is added to the subimage 18. For example, if the window 11 moves to the right, one column 19b is no longer part of the subimage 18, and one column 17b is added to the subimage 18.

The CLIC 12 stores data representative of the subimage 18. In recognition that the window 11 only moves over one column or row of pixels for each new position, the CLIC 12 does not retrieve duplicative data from the memory 3 for the portion of the subimage 18 that remains the same when the window 11 changes positions. Instead, for each change in position of the window 11, the CLIC 12 retrieves an update from the memory 3 which represents the new column or row of pixels that has been added to the subimage 18. The CLIC 12 then performs a shift of the image 18 currently stored by the CLIC 12 to create a vacancy for the update and fills in the vacancy with the update.

In this manner, each time the image processor 14 moves the window 11 to a new position, the CLIC 12 only retrieves one column or row of the subimage 18 from the memory 3. As a result, the CLIC 12 spends a minimal amount of time updating the currently stored version of the subimage 18 before providing the new image processor 14.

As an example of the panning of the window 11 over the image 18, the window 11 is initially positioned so that the upper lefthand corner of the window 11 coincides with the upper lefthand corner of the image 18. The image processor 14 then moves the window 11 downwardly one row of pixels for each new position. For each new position of the window 11, the CLIC 12 furnishes an analog representation to the subimage 18. When the bottom edge of the window 11 reaches the bottom edge of the image 16, the image processor 14 then advances the window 11 one column to the left before advancing the window 11 in an upward direction and continuing the scanning of the image 18.

A controller 6 transfers data that is representative of the image 16 from the imager 10 to the memory via a bus 4. The CLIC 12 also uses the bus 4 to retreive the updates from the memory 3. In alternative arrangements, the imager 10 is directly coupled to the CLIC 12, and instead of temporarily storing a representation of the image 16 in the memory 3, the CLIC 12 transfers the updates directly from the imager 10.

Figure 3:
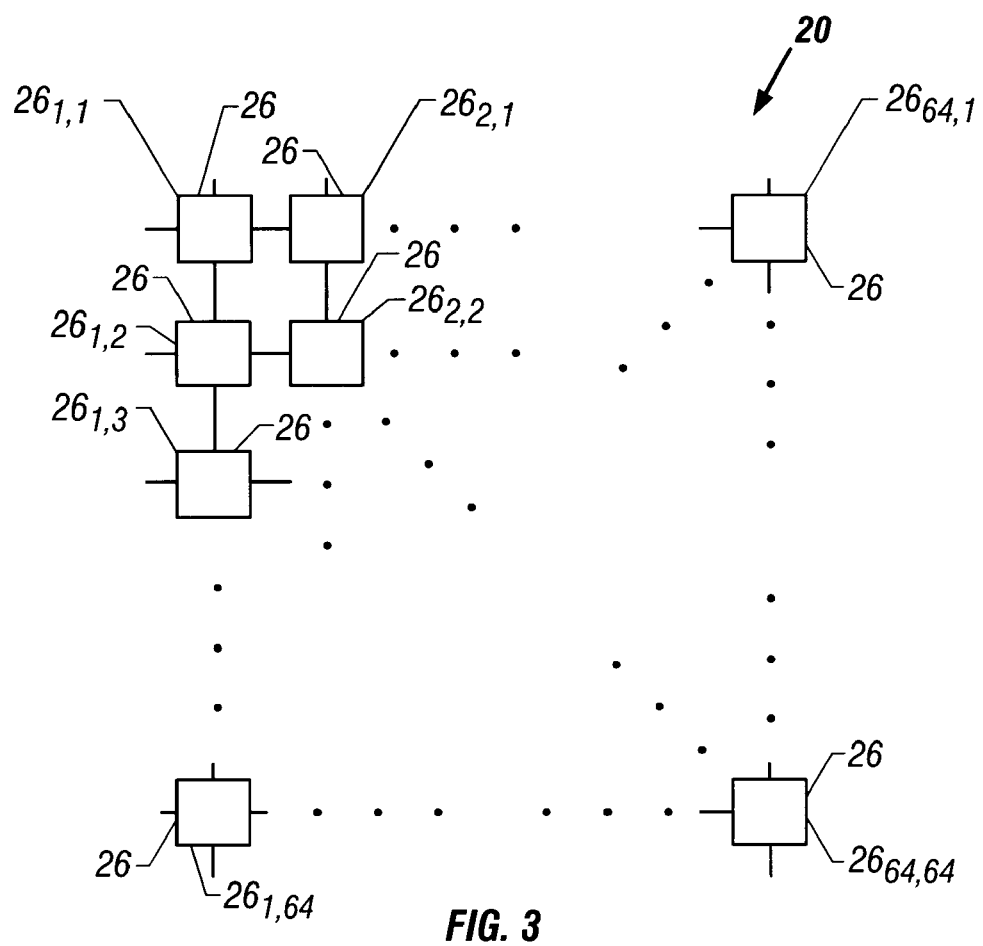
FIG. 3 is a schematic diagram of an array of a column loading input chip of FIG. 1.

Referring to FIG. 3, the CLIC 12 stores data representing the pixels of the subimage 18 in an array 20 of memory cell/digital-to-analog (MDAC) units 26. Each unit 26 stores a digital representation of a pixel of the subimage 18 and provides an analog representation of the pixel which is provided to the image processor 14. The arrangement of the pixels in the array 20 corresponds to the arrangement of the pixels in the subimage 18. Thus, columns and rows of the array 20 correspond to columns and rows, respectively, of the subimage 18. For example, the units $26_{1,1 \ldots 64}$ store representations of the column of pixels from the far left edge of the subimage 18.

Referring to FIG. 11, when the window 11 changes positions, the CLIC 12 shifts the image stored in the units 26 by one row or column to make room for the data from the new column or row 17 of the subimage 18. In effect, a column or row 19 of the current subimage that is stored in the CLIC 12 is discarded. The direction of the shifting among the units 26 corresponds to the direction in which the window 11 moves. For example, if the window 11 moves downwardly one row, then the rows of the units 26 are shifted downwardly one row. Thus, in this example, the contents of the units $26_{1 \ldots 64,1}$ are shifted to the units $26_{1 \ldots 64,2}$.

When the units 26 are shifted, one row or column of the units 26 becomes available to accept the update and one row or column of pixel data is discarded. Thus, for example, when the rows of the units 26 are shifted downwardly, the first row of units 26 (i.e., units $26_{1 \ldots 64,1}$) becomes available to accept a new row of pixel data, and the pixel data in the last row of units 26 (i.e., units $26_{1 \ldots 64,1}$) is effectively discarded (i.e., overwritten) to make room for the pixel data from the upper, adjacent row of units (i.e., units $26_{1 \ldots 64,63}$).

Figure 4:
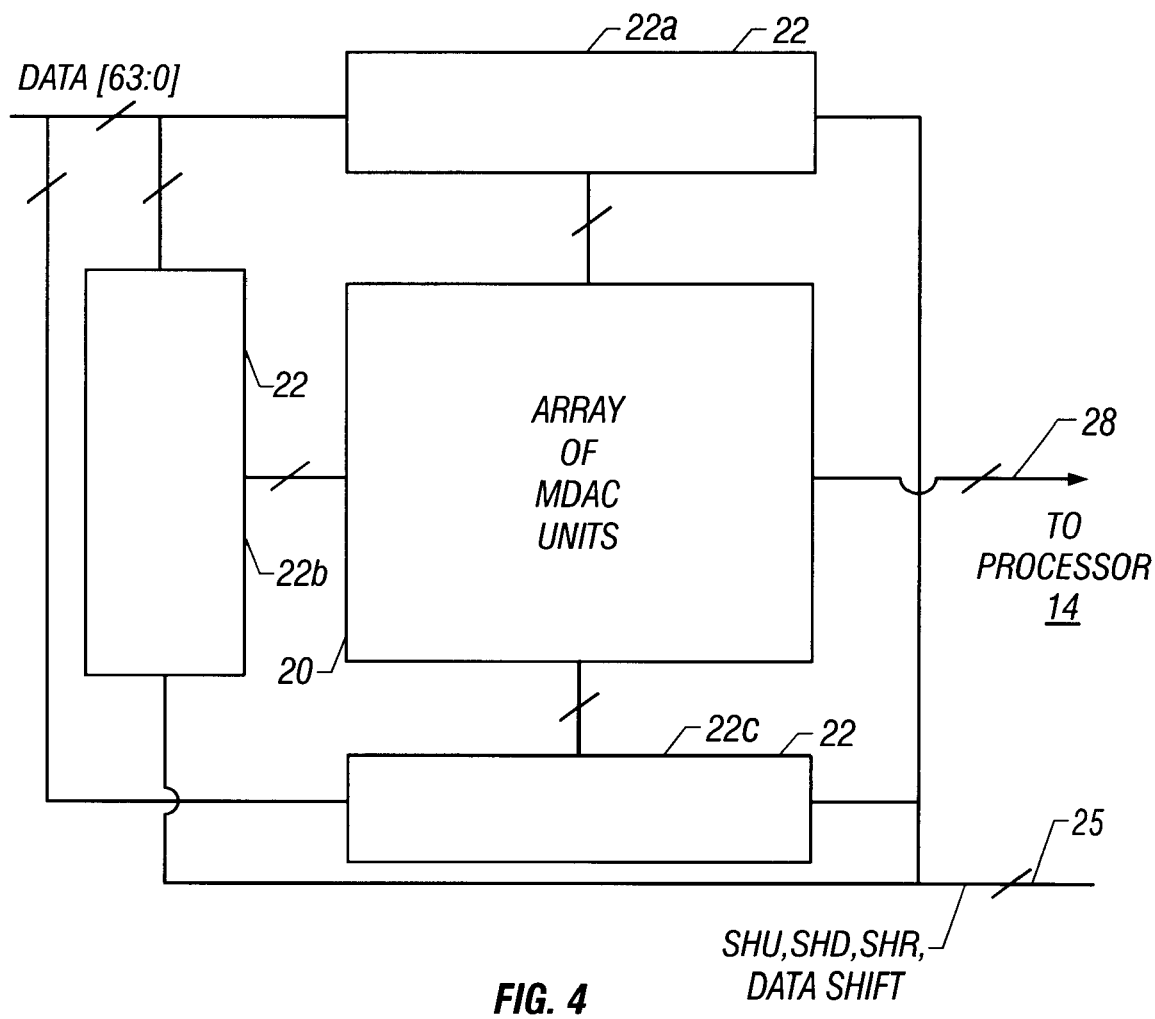
FIG. 4 is a block diagram of the column loading input chip.

Referring to FIG. 4, the outputs of each of the units 26 is provided to the image processor 14 via a collection of output pads 28 which are glued to the processor 14. Besides the array 20 of MDAC units 26, the CLIC 12 also has three banks 22 (i.e., banks 22a, 22b and 22c) of shift registers that the CLIC 12 uses to receive the update to the image 18 from the imager 10 and load the update into the array 20. The banks 22 are located on the left (for the bank 22b), top (for the bank 22a) and bottom (for the bank 22c) edges of the array 20. When the window 11 changes positions, the CLIC 12 is constructed to load one of the three banks with the update to form the new image 18. The particular bank 22 that is loaded depends on the direction in which the window 11 moves. This information is conveyed to the shift banks 22 through control lines 25 which carry a shift up signal (SHU), a shift down signal (SHD), and a shift right signal (SHR). The control lines 25 also carry a signal called DataShift, described below. The image processor 14 interacts with the CLIC 12 to adjust the levels of these signals. In alternative arrangements, the controller 6 (see FIG. 1) interacts with the CLIC 12 to adjust the levels of these signals. When a particular bank 22 is selected, only the clock signal for that particular bank is activated.

After being loaded, the bank 22 that is loaded transfers the update in a parallel fashion to the row or column that extends along the adjacent edge of the array 20. For example, if the window 11 moves in a downwardly direction, the CLIC 12 loads the bank 22a with the update. The bank 22a then transfers the update in a parallel fashion to the first row (i.e., units $26_{1 \ldots 64,1}$) of the array 20.

Figure 12:
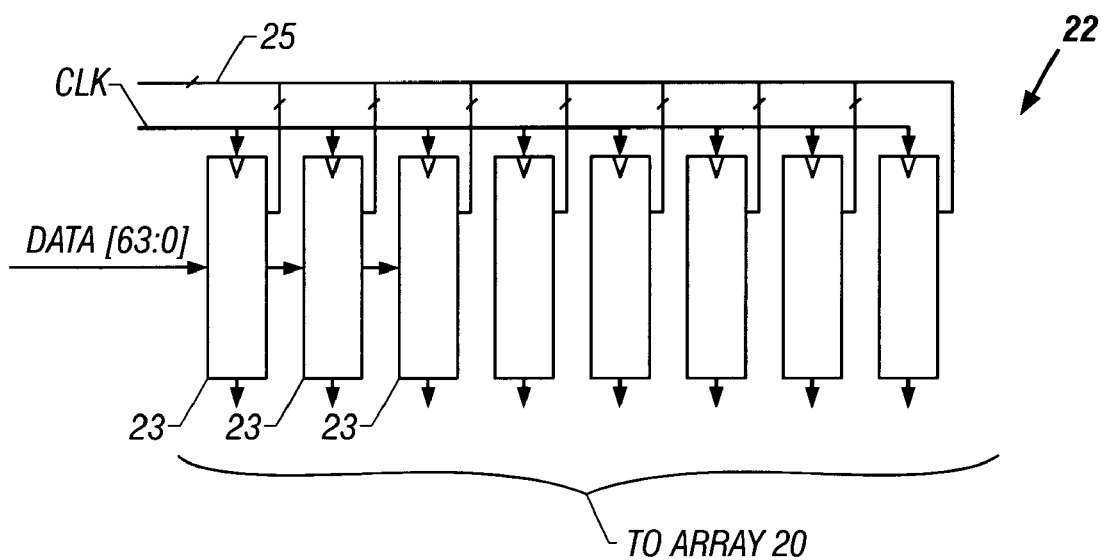
FIG. 12 is a schematic diagram of shift registers of the column loading input chip.
Figure 8:
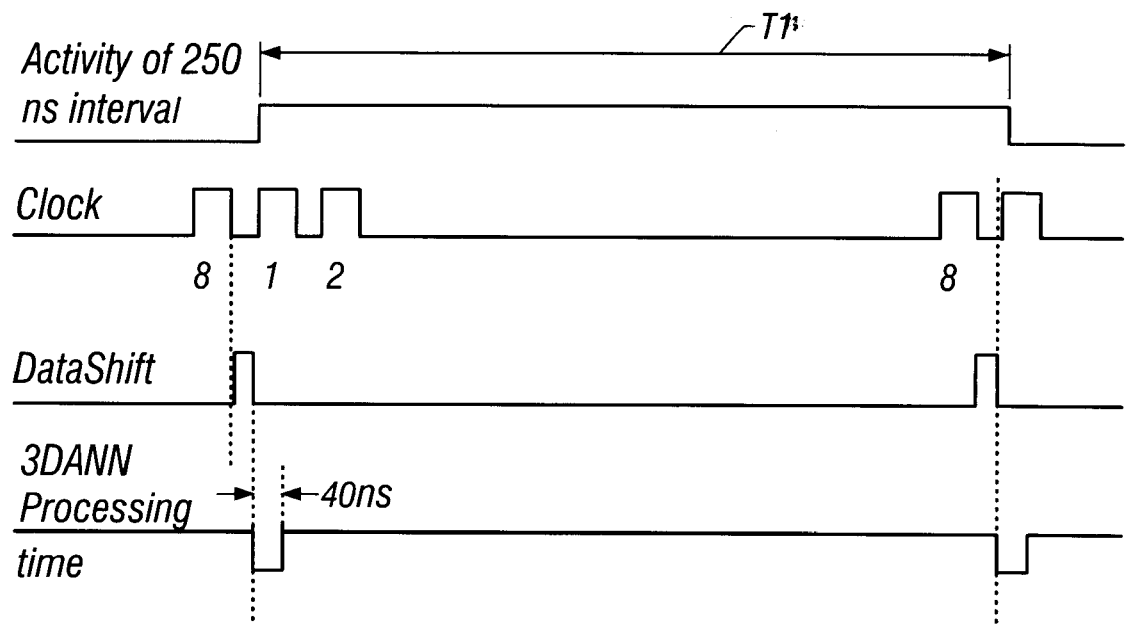
FIG. 8 is a timing diagram of the column loading input chip.

Although other arrangements are possible, the CLIC 12 is constructed to process a 64×64 byte subimage 18. As a result, each bank 22 contains eight, one byte shift registers 23 (see FIG. 12) that are chained together. Referring also to FIG. 8, the reception of the update by the CLIC 12 is synchronized to a clock signal (called CLK) and broken down into eight parts. Every cycle of the clock signal, the first register 23a of the bank 22 receiving the update receives another eight bytes of the update (represented by the bits called DATA[63:0]) and the registers 23 shift the byte data among themselves until all 64 bytes of the update is received into the registers 23. After this occurs, the processor 14 activates a data shift signal called DataShift to transfer the update from the bank 22 into the array 20.

Thus, three shift register banks 22 are used instead of, for example, one bank. Because a single bank has 512 data lines, extending a bus from the bank to every cell requires a larger space and introduces a larger parasitic capacitance. A larger parasitic capacitance typically implies more power consumption. As a result, the three data banks of the CLIC 12 permit a compact arrangment for the CLIC 12 as well as provide an arrangement that consumes a minimal amount of power.

As shown in FIG. 8, in some arrangements, the frequency of the clock signal is 32 Mhz which permits the subimage stored by the CLIC 12 in the array 20 to be updated at a rate of 4 Mhz, or every 250 ns (represented by time T1). Because the CLIC 12 concurrently provides analog representations of the subimage to the processor 14 while receiving an update to the subimage, the processor 14 can use most of the 250 ns (i.e., 250 ns less a 120 ns settling time interval, described below) to process the subimage.

Figure 5:
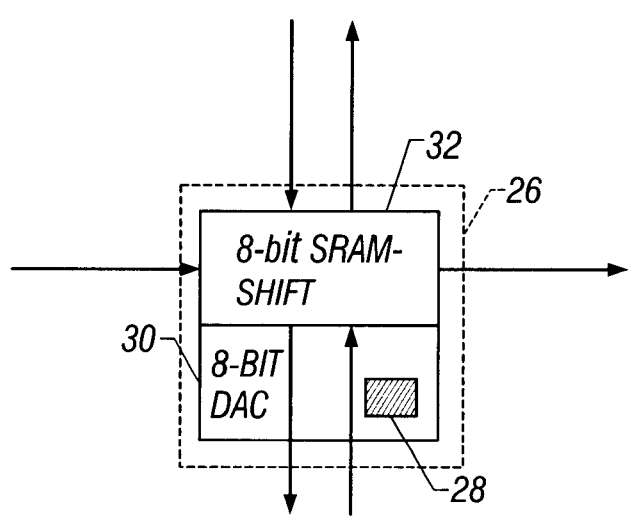
FIG. 5 is a schematic diagram of a unit of the array of FIG. 3.

Referring to FIG. 5, each MDAC unit 26 includes an eight bit, static random access memory (SRAM) 32 that stores eight bits of data, which is representative of one pixel. Depending on which shift control signal (i.e., either the SR, SU or SD signal) is activated, the SDRAM 32 receives new data from an adjacent memory unit 26 from one direction (e.g., the left direction) and transfers its currently stored data to an adjacent memory unit 26 in the opposite direction (e.g., the right direction). If the unit 26 is on the edge of the array 20 and the shift is in a direction away from the edge, the unit 26 receives its data from one of the shift register banks 22. If the unit 26 is on the edge of the array 20 and the shift is in a direction toward the edge, the unit 26 effectively discards its data (i.e., overwrites the current data with the new data). The unit 26 has one of the output pads 28.

Figure 6:
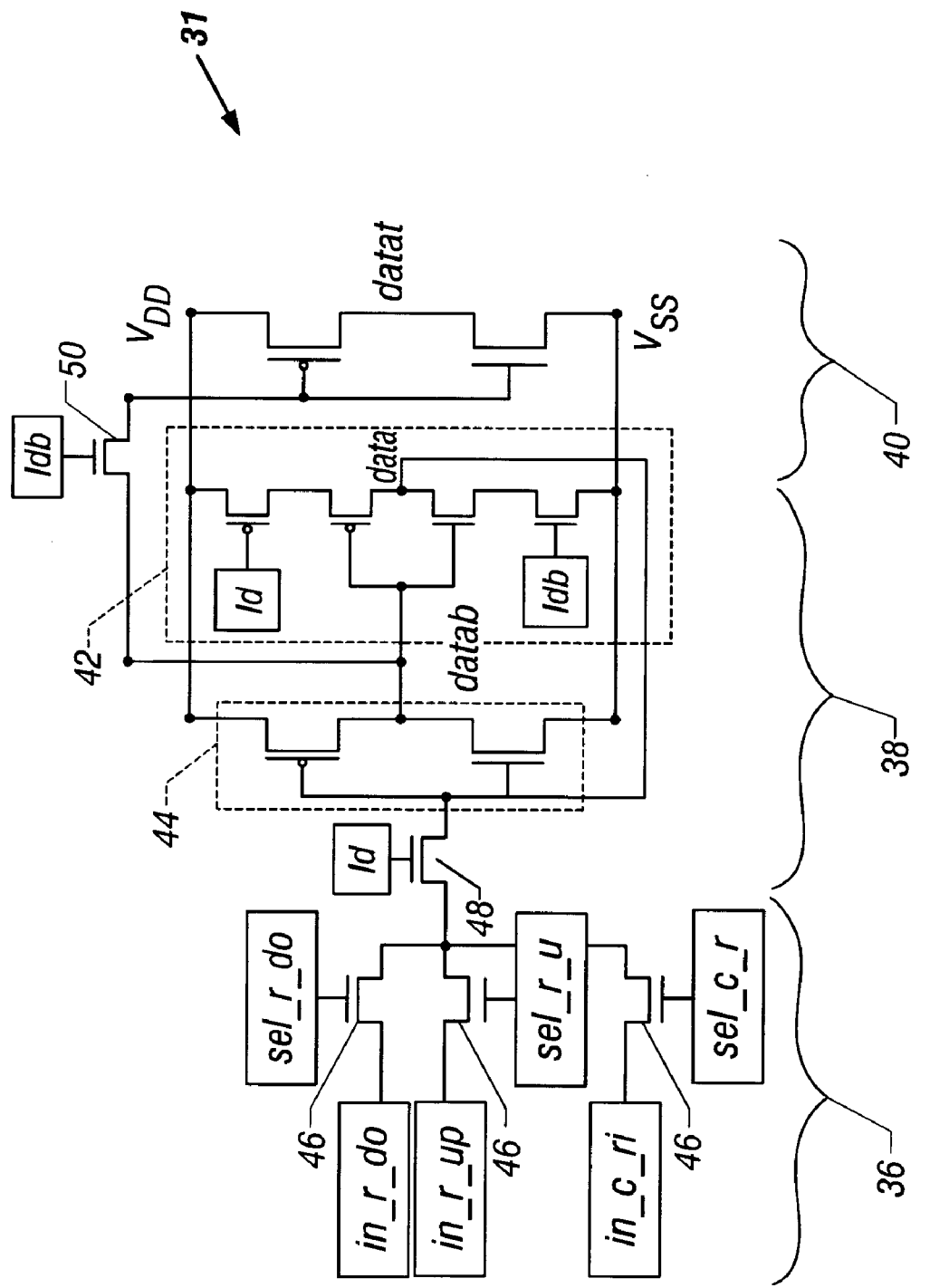
FIG. 6 is a schematic diagram of a memory cell of the unit.

Referring to FIG. 6, each SRAM 32 includes eight cells 31 to store eight bits of pixel data. The cell 31 includes a storage section 38 that is essentially two back-to-back inverters 42 coupled together to form a latch. The output of one 42 of the inverters holds a positive representation of the bit at a node called DATA, and the output of the other one 44 of the inverters holds a negative representation of the bit at a node called DATAB.

The cell 31 can receive data from cells in adjacent units 26 that are below, above or to the right of the cell 31. In this manner, the cell 31 has a multiplexing section 36 with pass transistors 46 that select one of the three possible sources for the data entering the cell 31.

New data is simultaneously transferred into the cell 31 while the currently stored data is simultaneously transferred out of the cell 31. To accomplish this, a signal called Ld controls a pass transistor 48 that is coupled between the multiplexing section 36 and the storage section 38. The complement of the Ld signal is represented by a signal called Ldb. The Ldb signal controls a pass transistor 50 that is coupled between the DATAB node and an inverting output section 40 (e.g., a CMOS inverter) of the cell 31.

Figure 7:
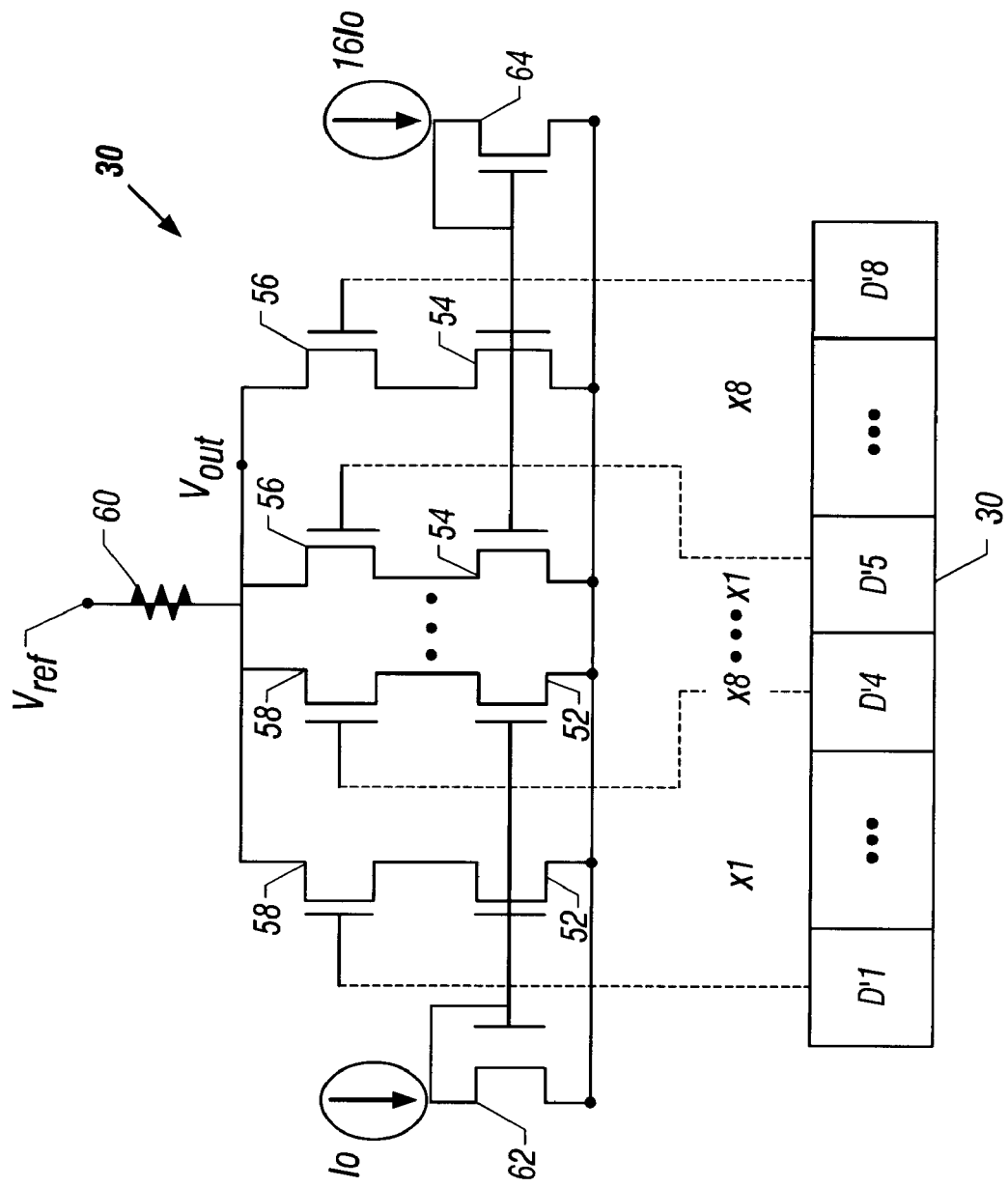
FIG. 7 is a schematic diagram of a digital-to-analog converter of the unit.

Referring to FIG. 7, the DAC 30 for each unit 26 is essentially a binary weighted, current scaled DAC. The DAC 30 includes eight transistors 52 and 54 that are placed in current mirror arrangements. The current path of each of the transistors 52 and 54 is serially coupled to an output node called Vout through a different one of eight pass transistors 56 and 58. The Vout node is coupled to a reference voltage called Vref through a resistor 60 (e.g., a 10 Kohm resistor).

The aspect ratios of four 52 of the transistors are binary scaled (i.e., aspect ratios equal to 1X, 2X, 4X and 8X) and placed in a current mirror arrangement (via a transistor 62) with a current source Io. The four least significant bits of the SRAM 32 control different ones of the pass transistors 52 and are arranged so that more significant bits contribute more to the output voltage Vout.

The aspect ratios of the other four transistors 54 are also binary scaled (i.e., aspect ratios equal to 1X, 2X, 4X and 8X). However, these transistors 54 are arranged in a current mirror arrangement (via a transistor 64) with a current source 16Io. Thus, relative to the transistors 52, the transistors 54 have aspect ratios of 16X, 32X, 64X and 128X. The four most significant bits of the SRAM 32 control different ones of the pass transistors 54 and are arranged so that more significant bits contribute more to the output voltage Vout.

The conversion by the DAC 30 is described by the following equation:

$$V_{out} = V_{ref} - R \cdot \left[ \sum_{i=1}^{4} I_o(1-D_i)2^{i-1} + \sum_{i=5}^{8} 16I_o(1-D_i)2^{i-1} \right]$$

Figure 9:
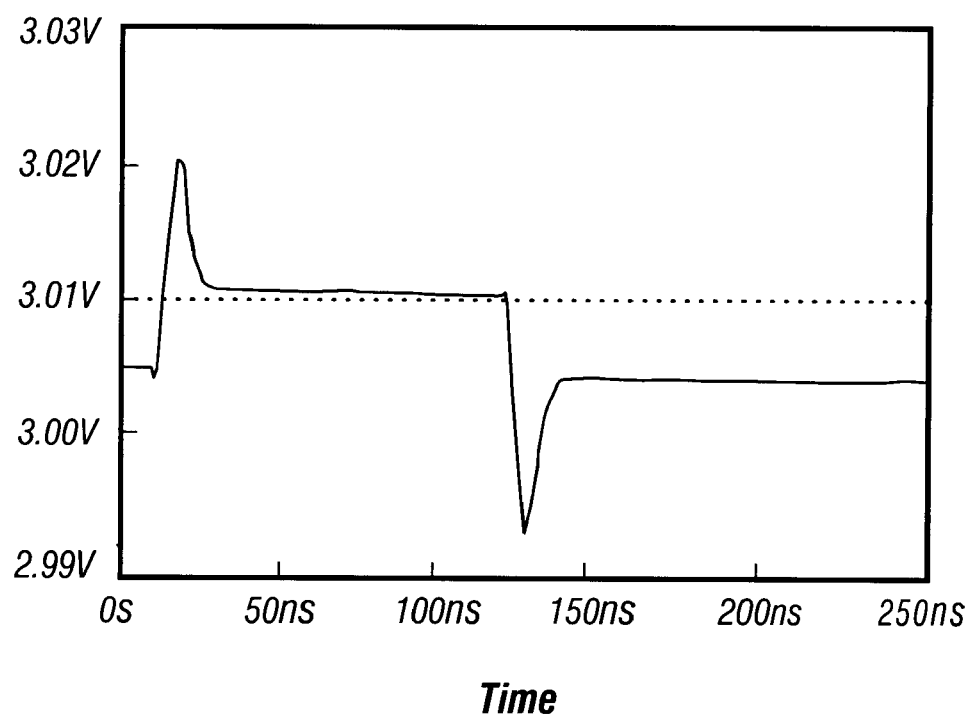
FIG. 9 is a waveform showing settling time characteristics of the digital-to-analog converter.
Figure 10:
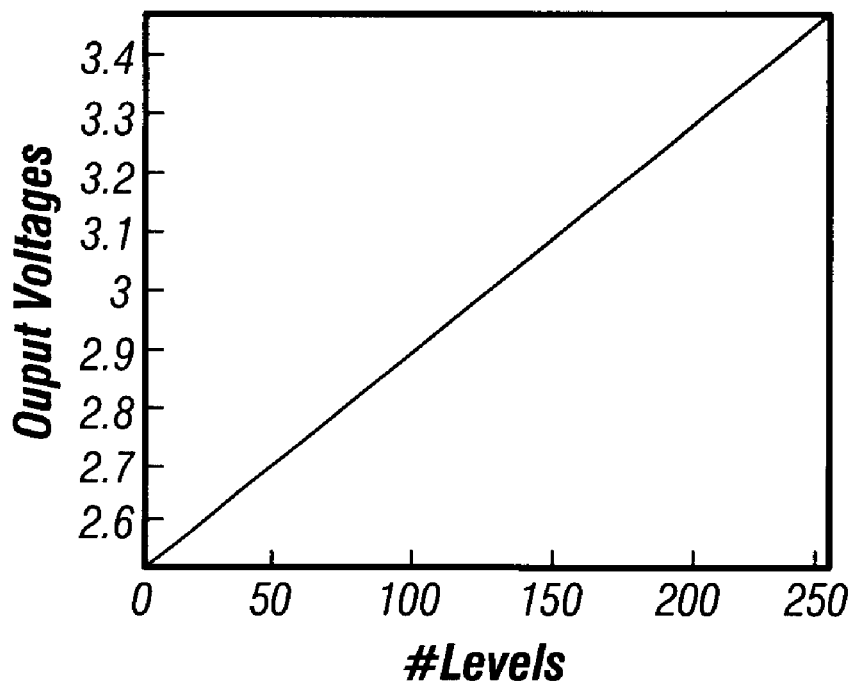
FIG. 10 is a waveform showing linearity of characteristics the digital-to-analog converter.

Referring to FIG. 9, in simulations, the settling time of the DAC 30 is approximately 120 ns which effectively sets the settling time for the CLIC 12 (see FIG. 8) and sets the time available for processing the subimage to 130 ns. Referring to FIG. 10, the linearity of the DAC 30 in simulations is shown for all two hundred fifty-five levels, or values, for eight bits.

Other embodiments are within the scope of the following claims.

What is claimed is:

1. A circuit for use with an imager capable of capturing an image, comprising:
   a memory configured to:
      during a first time interval, store a first representation of a first subimage of the image from the imager, and
      during a second time interval, receive an update from the imager and use the update and the first representation to store a second representation of a second subimage of the image, the first subimage partially overlapping the second subimage and the update representing a portion of the second subimage not present in the first subimage,
   wherein the memory comprises memory cells configured to shift the first representation among the cells to form the second representation; and
   an output circuit configured to:
      during the first time interval, use the first representation to generate output signals representative of the first subimage, and
      during the second time interval, use the second representation to generate output signals representative of the second subimage,
      wherein the second subimage is offset from the first subimage along one of at least two different directions,
      wherein, during the second time interval, the memory cells are further configured to shift the first representation among the cells along said one of the directions, and
      wherein the memory further comprises at least two shift register banks, each different shift register bank associated with a different one of the directions and operable to receive the update when the direction associated with the bank corresponds to said one of the directions.

2. The circuit of claim 1, wherein the memory cells are configured to discard a portion of the first representation to form the second representation.

3. The circuit of claim 1, wherein the memory cells include:
   first, second and third groups of memory cells configured to store the first representation during the first time interval,
   the first group of memory cells configured to receive the update during the second time interval,
   the second group of memory cells configured to discard a portion of the first representation during the second time interval, the portion being equivalent in size to the update, and the third group of memory cells configured to shift the first representation from the first group of memory cells toward the second group of memory cells during the second time interval.

4. A circuit for use with an imager capable of capturing an image, comprising:
   a memory configured to:
      during a first time interval, store a first representation of a first subimage of the image from the imager, and
      during a second time interval, receive an update from the imager and use the update and the first representation to store a second representation of a second subimage of the image, the first subimage partially overlapping the second subimage and the update representing a portion of the second subimage not present in the first subimage, wherein the memory includes memory cells configured to shift the first representation among the memory cells to form the second representation; and
   an output circuit configured to:
      during the first time interval, use the first representation to generate output signals representative of the first subimage, and
      during the second time interval, use the second representation to generate output signals representative of the second subimage,
      wherein the second subimage is offset from the first subimage along one of at least three different directions,
      wherein during the second time interval, the memory cells are further configured to shift the first representation among the cells along said one of the directions, and
      wherein the memory further comprises at least three shift register banks, each different shift register bank associated with a different one of the directions and operable to receive the update when the direction associated with the bank corresponds to said one of the directions.

5. The circuit of claim 4, wherein at least two of the directions are orthogonal to each other and at least two of the directions are directly opposed.

6. The circuit of claim 1, wherein
   the imager includes a rectangular array of pixel cells configured to capture the image, the array arranged in rows and columns, each pixel cell providing an output, and
   the first representation is indicative of the outputs of the pixel cells from a subregion of the array.

7. The circuit of claim 6, wherein the subregion comprises another rectangular array of pixel cells.

8. The circuit of claim 6, wherein the update is indicative of the outputs of the pixel cells from one of the rows of the array.

9. The circuit of claim 6, wherein the update is indicative of the outputs of the pixel cells from one of the columns of the array.

10. The circuit of claim 1, wherein the output circuit comprises digital-to-analog converters.

11. The circuit of claim 1, wherein
the memory comprises memory cells configured to shift the first representation among the cells to form the second representation, and
the output circuit comprises digital-to-analog converters, each different digital-to-analog converter connected to a different one of the memory cells.

12. A method of processing an image, comprising:
storing a first representation of a first subimage of the image, said first subimage being less than the whole image and said first representation being offset from the first subimage along one of at least two different directions;
during a first time interval, generating output signals representative of the first subimage;
during a second time interval, receiving an update representing an additional portion of the image;
using the update and the first representation to store a second representation of a second subimage of the image by including an operation to shift the first representation among memory cells along one of the at least two different directions, the first subimage partially overlapping the second subimage and the update representing a portion of the second subimage not present in the first subimage;
using the second representation to generate output signals representative of the second subimage; and
receiving the update in one of at least two different shift register banks based on the direction, each different shift register bank associated with a different one of the directions.

13. The method of claim 12, wherein the shifting includes discarding a portion of the first representation to form the second representation.

14. The method of claim 12, wherein
the storing the first representation of the first subimage includes storing the first representation in first, second and third groups of memory cells, and
the shifting includes using the first group of memory cells to receive the update during the second time interval,
during the second time interval, discarding a portion of the first representation stored in the second group of memory cells, the portion being equivalent in size to the update, and
using the third group of memory cells to shift the first representation from the first group of memory cells toward the second group of memory cells.

15. The method of claim 12, wherein
the second subimage is offset from the first subimage along one of at least two different directions, and
the shifting includes shifting the first representation among the cells along said one of the directions.

16. The method of claim 12, wherein
the second subimage is offset from the first subimage along one of at least three different directions, and
the shifting includes shifting the first representation among the cells along said one of the directions.

17. The method of claim 16, further comprising:
receiving the update in one of at least three different shift registers based on the direction of the shifting.

18. The method of claim 17, wherein at least two of the directions are orthogonal to each other and at least two of the directions are directly opposed.

19. The method of claim 12, wherein
the imager includes a rectangular array of pixel cells configured to capture the image, the array arranged in rows and columns, each pixel cell providing an output, and
the first representation is indicative of the outputs of the pixel cells from a subregion of the array.

20. The method of claim 19, wherein the subregion comprises another rectangular array of pixel cells.

21. The method of claim 19, wherein the update is indicative of the outputs of the pixel cells from one of the rows of the array.

22. The method of claim 19, wherein the update is indicative of the outputs of the pixel cells from one of the columns of the array.

23. A circuit for loading a second subimage of an image captured by an imager, the second subimage partially overlapping a first subimage of the image and being partially offset from the first subimage along one of at least two directions, the imager capable of furnishing a first representation of the first subimage and an update representing a portion of the second subimage not present in the first subimage, comprising:
a memory comprises at least two shift registers banks, each different shift register bank associated with a different one of the directions and configured to receive the update when the second subimage is offset from the first subimage along the direction;
the memory cells connected to the banks and configured to:
during a first time interval, store the first representation in first, second and third groups of the memory cells, and
during the second time interval,
discard a portion of the first representation stored in the second group of the memory cells,
use the third group of the memory cells to shift the first representation from the first group of the memory cells toward the second group of the memory cells, and
store the update in the first group of the memory cells; and
digital-to-analog converters, each different digital-to-analog converter connected to a different one of the memory cells, the digital-to-analog converters configured to:
during the first time interval, generate output signals representative of the first representation, and
during the second time interval, generate output signals representative of the second representation.

* * * * *

UNITED STATES PATENT AND TRADEMARK OFFICE
CERTIFICATE OF CORRECTION

PATENT NO.      : 6,307,587 B1
DATED           : October 23, 2001
INVENTOR(S)     : Tuan A. Duong It is certified that error appears in the above-identified patent and that said Letters Patent is hereby corrected as shown below:

Column 1,
Please insert the following paragraph before Background of the Invention:
-- STATEMENT AS TO FEDERALLY-SPONSORED RESEARCH
  The invention described herein was made in the performance of work under a NASA 7-1260 contract, and is subject to the provisions of Public Law 96-517 (U.S.C. 202) in which the contractor has elected to retain title. --

Signed and Sealed this

Sixteenth Day of April, 2002

Attest:

JAMES E. ROGAN
*Attesting Officer*   *Director of the United States Patent and Trademark Office*